United States Patent [19]
Abrahamson

[11] 4,244,606
[45] Jan. 13, 1981

[54] APPARATUS FOR REDUCING THERMAL FATIGUE IN A PIPING SUSPENSION SYSTEM FOR A HIGH TEMPERATURE FURNACE

[75] Inventor: LeRoy E. Abrahamson, Seabrook, Tex.

[73] Assignee: Shell Oil Company, Houston, Tex.

[21] Appl. No.: 946,676

[22] Filed: Sep. 28, 1978

[51] Int. Cl.³ .............................................. F16L 55/00
[52] U.S. Cl. ...................................... 285/14; 285/61; 285/286; 285/179; 285/157; 248/58
[58] Field of Search ...................... 285/61, 62, 63, 64, 285/157, 14 A, 21, 286, 174; 248/58, 317; 228/103, 184, 214, 221

[56] References Cited

U.S. PATENT DOCUMENTS

| 598,992 | 2/1898 | Hosford | 285/61 X |
|---|---|---|---|
| 1,042,587 | 10/1912 | Moore | 285/61 X |
| 2,959,024 | 11/1960 | Eckert et al. | 285/41 X |
| 3,088,755 | 5/1963 | Klamm | 285/64 |
| 3,508,766 | 4/1970 | Kessler et al. | 285/21 |
| 3,722,582 | 3/1973 | Rinecker | 285/157 X |
| 3,933,377 | 1/1976 | Arrowsud | 285/61 |

FOREIGN PATENT DOCUMENTS 511658  1/1976  Japan ........................................ 228/103

Primary Examiner—Dave W. Arola

[57] ABSTRACT

Structural failures in high temperature piping arrangements are eliminated or greatly reduced by employing special pipe fittings which are connected to hanger or guide members. Each of the special pipe fittings is provided with a hollow boss to which a pipe hanging member may be fixedly secured. Suitable venting means are provided between the chamber in the hollow boss and the space outside thereof so as to prevent undue buildup of pressure within the boss.

5 Claims, 3 Drawing Figures

APPARATUS FOR REDUCING THERMAL FATIGUE IN A PIPING SUSPENSION SYSTEM FOR A HIGH TEMPERATURE FURNACE

BACKGROUND OF THE INVENTION

Many failures have been experienced in pipe hanging arrangements used in high temperature chemical furnaces. It has been found that thermal fatigue cracks are often formed in the very thick back wall of a pipe fitting during long term service. One wall of a pipe fitting is inherently thicker or contains more metal than the opposite wall when a boss is formed thereon to which a pipe hanger is secured. Many chemical furnaces operate at temperatures varying from 1,000° to 2,000° F. or more. As the temperature within a furnace fluctuates, a differential in loss of temperature between a thick and a thin wall of a pipe fitting is experienced which in turn causes thermal fatigue and ultimately cracking and failure of the pipe fitting.

SUMMARY OF THE INVENTION

It is intended, by the present invention, to provide a method and apparatus for reducing the thermal fatigue in certain components of a piping arrangement to be employed in a high temperature environment, such for example as a high temperature furnace or chemical reactor operating at temperatures of from 1000° to 2000° F. or more. Since most of the failures of a piping arrangement under high temperature conditions occurs in the cast pipe fittings to which hanger rods, support members or guide members are secured, it is the object of this invention to provide the pipe fittings that are to be used in this manner with a boss which has been cast into the pipe fitting at a selected point on the surface thereof. It is also an object of the present invention to substantially equalize the thickness and/or volume of metal at all points on a pipe fitting so that there is substantially equal temperature gain or loss to all areas of the fitting at the same time. In order to accomplish this each boss on a fitting is provided with a chamber open at one end, which chamber is either drilled or cast into the boss. Thus, the boss is essentially hollow. In addition, conduit means are provided in the pipe hanger or support means which are attached to the boss so that the interior of the chamber in the boss is in communication with the outside thereof, that is, with the interior of the furnace. This obviates the danger of air or gas trapped in the chamber causing a fracture or possible rupture of a weld securing the support, guide or hanger to the outer edge of the boss.

BRIEF DESCRIPTION OF THE DRAWING

Other objects of this invention will be understood from the following description taken with reference to the drawing wherein.

DESCRIPTION OF A PREFERRED EMBODIMENT

Figure 1:
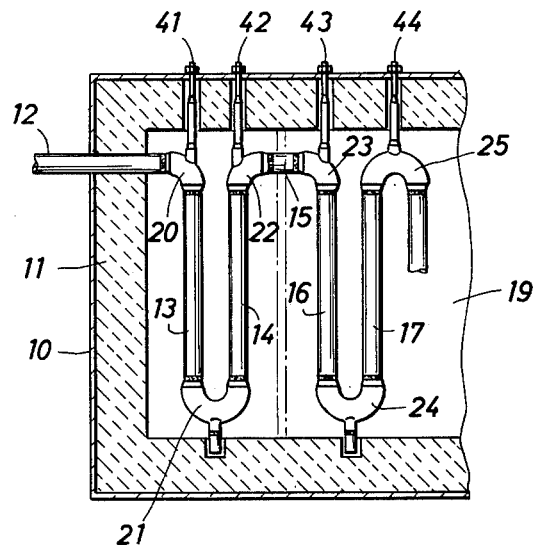
FIG. 1 is the diagrammatic view taken in cross section illustrating a piping arrangement in a furnace or other vessel lined with refractory material.

Referring to FIG. 1 of the drawing, a high temperature vessel, furnace or reactor 10 is illustrated as being lined with refractory material 11. Arranged in the interior 19 of vessel 10 are a series of pipe sections 12 through 18 interconnected by means of pipe fittings 20 through 25. In the case of pipe fittings 20, 22 and 23, 90° ells are illustrated, while pipe fittings 21, 24 and 25 are 180° return bends or U-bends. As shown in more detail in FIG. 2, pipe sections 13 and 14 are fixedly secured to the return bend 21 in any suitable manner, as by welding at points 26 and 27. The welds connect the pipe sections to the return bend 21 in a fluid tight manner. It is understood that screw connections could be employed as well.

Figure 2:
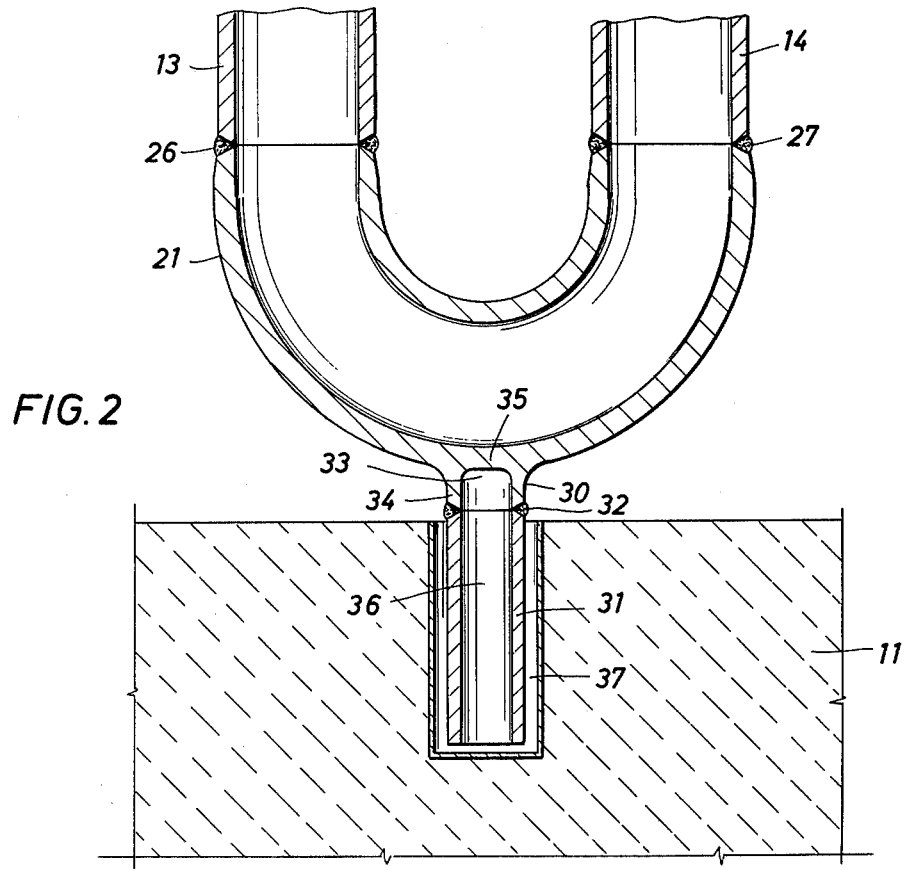
FIG. 2 is a cross sectional view, taken in enlarged detail, of one form of a pipe fitting, in accordance with the present invention, provided with a downwardly extending guide pin or support means.

Referring to FIG. 2 of the drawing, the pipe fitting in the form of return bend 21 is provided on the outer surface thereof with a boss 30 which forms a support base means to which elongated rod means 31 may be fixedly secured by welding as at 32. The boss 30 is provided within interior chamber 33 formed within a circumferential wall 34 extending downwardly from the outer surface of the return bend 21. Thus it may be seen that the wall 35 of the return bend 21 opposite the boss 30 closes the chamber 33. Prior to connecting the rod means 31 to the outer edge of the circumferential wall 34, the open end of the chamber 33 within the boss 30 was directed downwardly with the rod means 31 being in the form of a tubular member having a bore 36 therein. The chamber 33 within the boss 30 is in communication through bore 36 and space 37 with the interior of the furnace 19. As shown in FIG. 2, the tubular rod member 31 may act as a support means that is preferably employed as a guide means movable within the space 37 either laterally or vertically as changes in temperature within the furnace cause contraction or expansion of the piping system.

Referring to FIG. 1 of the drawing, it may be seen that pipe fittings 20, 22, 23 and 25 are secured to pipe hangers 41, 42, 43 and 44. One form of a pipe hanger 42 is shown in greater detail in FIG. 3 as being made up of an upper solid section 42 which is welded, as at 45, to a hanger connector 46 which forms the lower extension of hanger rod 42. The lower end of the hanger connector 46 is shown as being flared to the same diameter as the outer walls 48 of an upwardly-directed boss 47. The chamber 50 formed by the wall 48 of the boss 47 may cooperate with a second chamber 51 preferably formed in the lower end of the hanger rod or its connector 46. The hanger connector 46 is fixedly secured to the wall 48 of the boss 47 in any suitable means, preferably by welding as at 52. The chamber 51 formed in the lower end of the connector 46 forms an extension of the chamber 50 formed within the boss or hanger base means 47.

Since the chambers 50 and 51 will be filled by air or a gas when the two elements 46 and 47 are welded together at 48, air or gas will be trapped in the chambers. When this construction is put in the furnace and exposed to, say, 2000° F. temperature, there is a possibility that the air or gas in the chambers 50 and 51 will expand so that the weld 52 is at least partially ruptured. The chambers 50 and 51 may have been formed either by drilling or by casting. To alleviate any expansion of gases in the chambers 50 and 51, either the boss 47 is provided with suitable conduit means, such as a vent or hole 53 through the wall 48 of the boss 47, or with a vent hole 54 through the wall of the hanger connector 46. Thus, the chambers 50 and 51 are in communication at all times with the space outside the boss 47 or within the furnace 19. In the event that the hanger rod connected to boss 47 is tubular in structure similar to rod 31 shown in FIG. 2, then the interior of the chamber would communicate up through the bore of such a rod. It is essential that the chambers or cavities within the bosses in accordance with the present invention be in communication with the space outside thereof.

Figure 3:
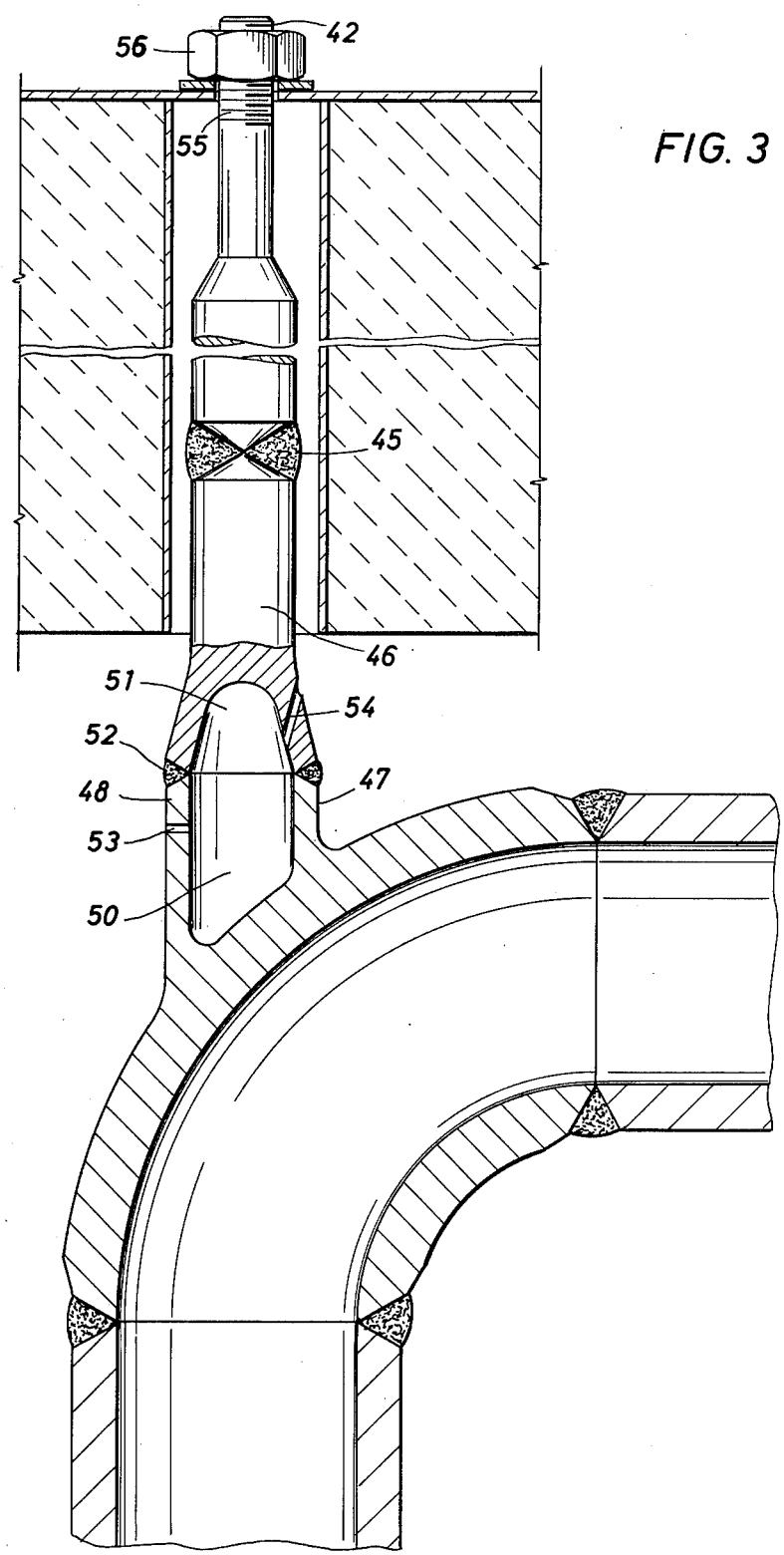
FIG. 3 is a view taken in partial cross sectional detail, in enlarged detail, of another form of pipe coupling in accordance with the present invention secured to a pipe hanger and hung from the top of a vessel.

In FIG. 3, the hanger rod 42 is shown as being screw-threaded at the top thereof, as at 55, which is provided with a nut 56 and serves as means for holding the hanger 42 in place. This arrangement of elements 42, 55 and 56 are shown for purposes of describing one type of connector means that may be used at the top of the hanger. Since this arrangement forms no part of this invention it will not be further described here.

It may be seen that a method of reducing thermal fatigue in the cast tubular fittings of a piping system being used in a high temperature furnace or other reactor vessel has been provided which will last for years without having to shut down the furnace, open it up and replace the damaged piping. The high temperature pipe fittings 20 through 25 are cast with a boss 30 (FIG. 2) or 47 (FIG. 3) on the outer wall of each of the fittings to which a pipe hanger support, guide or aligning means is to be secured. While the structure of a return bend fitting 21 has been described with regard to FIG. 2 and a 90° ell pipe fitting has been described with FIG. 3, it is to be understood that fittings of other angles may be cast according to the teachings of this invention, including a straight run fitting or coupling. The boss or support base means of each fitting is provided with a chamber which may be formed during the casting or may be drilled. In turn, each chambered boss is provided and fixedly secured to a chambered hanger, which chamber may be in the form of a bore 36 of a tubular member 31, as shown in FIG. 2, or in the form of a chamber 51 in a solid rod shown in FIG. 3. Each chambered hanger is fixedly secured to each chambered boss with the chambers in communication with each other with venting being provided from the combined chambers to the outside thereof in communication with the interior of the furnace.

We claim as our invention:

1. Apparatus for use in high-temperature piping arrangements comprising:
    a tubular metal pipe fitting having a wall of selected thickness defining inner and outer surfaces of said fitting, said inner wall surface defining the bore of said tubular fitting,
    upwardly-directed support base means having wall means formed on the upper outer surface of said fitting and extending outwardly and upwardly therefrom,
    said wall means forming a chamber in said support base means with the outer wall of said pipe fitting closing the bottom of the chamber and the other end being open,
    said support base means adapted to be secured to movement-limiting means for said pipe fitting, and
    elongated vertical support rod means fixedly connected to the upper end of the wall means forming the open end of the chamber within said support base means.

2. The apparatus of claim 1 wherein at least a portion of the lower end of said rod means has a chamber formed therein and positioned in a manner to form an extension of said chamber within said support means base,
    and conduit means in open communication at all times between the chamber within said support means and the space outside thereof.

3. The apparatus of claim 1 wherein said elongated rod means is a solid rod pipe hanger supporting said pipe fitting, the open ends of which are connectable to sections of pipe.

4. The apparatus of claim 1 wherein said rod means is a solid metal bar having a chamber formed in the end thereof that is fixedly secured to the outer edge of the wall means forming said chamber in said support base means, said chambers being coaxially displaced and in communication so as to form an enlarged chamber, and
    open port means through the wall forming said enlarged chamber.

5. The apparatus of claim 1 wherein the thickness of the wall means of said support base means is less than the thickness of the wall of the pipe fitting.

* * * * *